United States Patent [19]

Ohmori

[11] Patent Number: 4,546,932
[45] Date of Patent: Oct. 15, 1985

[54] SPINNING TYPE FISHING REEL WITH SELECTABLY CLICKING OR NON-CLICKING RATCHET MECHANISM

[75] Inventor: Hatsutaro Ohmori, Tokyo, Japan

[73] Assignee: Kabushiki Kaisha Ohmori Seisakusho, Kawagoe, Japan

[21] Appl. No.: 561,885

[22] Filed: Dec. 15, 1983

[51] Int. Cl.⁴ .................. A01K 89/01; A01K 89/02; F16D 63/00
[52] U.S. Cl. .................. 242/84.21 R; 242/84.5 R; 188/82.3; 188/82.4; 74/576
[58] Field of Search .............. 242/84.21 R, 84.51 R, 242/84.51 A, 84.5 A, 84.5 R, 84.2 R, 84.2 A; 188/82.3, 82.34, 82.4; 74/576

[56] References Cited

U.S. PATENT DOCUMENTS

| | | | |
|---|---|---|---|
| 4,163,528 | 8/1979 | Egasaki et al. | 242/84.51 A X |
| 4,300,730 | 11/1981 | Carlsson et al. | 242/84.2 R |
| 4,340,189 | 7/1982 | Volkert et al. | 188/82.4 X |
| 4,359,197 | 11/1982 | Neufeld | 242/84.5 A |
| 4,391,418 | 7/1983 | Puryear | 242/84.5 A X |
| 4,463,916 | 8/1984 | Puryear | 242/84.2 A |

FOREIGN PATENT DOCUMENTS

1073794  1/1960  Fed. Rep. of Germany ..... 242/84.2 R

*Primary Examiner*—Stuart S. Levy
*Assistant Examiner*—Joseph J. Hail, III
*Attorney, Agent, or Firm*—Michael D. McCully

[57] ABSTRACT

This spinning type fishing reel includes a main body with a handle shaft and a spool cup shaft driven therefrom rotatably supported in it. A ratchet is mounted on the spool cup shaft, and a pawl is biased towards the ratchet so as, when pressed thereagainst, only to let the ratchet and spool cup shaft and handle shaft rotate in their certain rotational directions to wind up the fishing line. A friction member is mounted on the handle shaft so as to be slippably connected thereto with a certain frictional torque being required to be applied therebetween before mutual slippage occurs in either rotational direction. A control member selectively either: (a) interferes with the friction member but not with the pawl; or (b) does not interfere with either the friction member or the pawl; or (c) interferes with both the friction member and the pawl. When the friction member is not interfered with by the control member, when rotatingly carried by the handle shaft rotating in its certain rotational direction it interferes with the pawl so as to bias it away from the ratchet, while when rotatingly carried by the handle shaft rotating in the opposite rotational direction it does not thus interfere with the pawl. When the friction member is interfered with by the control member, it is not allowed to interfere with the pawl. The pawl, when interfered with by the control member, is biased away from the ratchet.

3 Claims, 16 Drawing Figures

SPINNING TYPE FISHING REEL WITH SELECTABLY CLICKING OR NON-CLICKING RATCHET MECHANISM

BACKGROUND OF THE INVENTION

The present invention relates to a spinning type fishing reel, and more particularly relates to a spinning type fishing reel with an improved ratchet mechanism for preventing a spool cup on which is provided a line guide or pickup or bail from rotating in the reverse direction and for preventing unwinding of the fishing line.

Generally in the prior art a spinning type fishing reel is provided with a one way or ratchet mechanism for allowing the fishing line to be wound onto the spool thereof, as when the fisherman using the reel rotates a winding handle thereof in the winding direction, while preventing said line from being unwound from said spool and said winding handle from rotating in the reverse direction to said winding direction, as when the fisherman releases said winding handle and the fishing line is in tension. Now, in a conventional such fishing reel, such a ratchet mechanism has been a simple one incorporating a pawl and a ratchet wheel, and has produced a repeated clicking sound by the pawl repeatedly impacting the teeth of the ratchet wheel, when the winding handle is being rotated in the aforesaid winding direction so as to wind in the fishing line. This repeated clicking noise is detrimental to the quality of the environment when the fishing is being performed in a quiet environment, and sometimes irritates some fishermen; and in an extreme case it can even frighten the fish.

Therefore, a desire has arisen among the fishing public for a type of spinning type fishing reel which does not produce such a clicking sound when the fishing line is being wound in, but is substantially silent. Such so called silent reels, in which the ratchet or one way mechanism is more complicated than such an above mentioned simple one incorporating a pawl and a ratchet wheel, have lately come to be introduced, and these fishing reels are nowadays becoming very popular, particularly in Europe and North America.

However, on the other hand, when there is loud ambient noise such as water or wave noise, then the clicking sound of the pawl against the ratchet wheel during winding in of the fishing line is not really annoying, and in fact some fisherman actually prefer for such a noise to be present. For such people, in such circumstances, the above described silent spinning type fishing reels which produce no clicking sound during winding in of the fishing line are quite unsatisfactory.

Further, in the construction of a spinning type fishing reel, it is desirable that also the option should be available, when desired, of suspending the operation of the above described ratchet mechanism, so that the fishing line is allowed to be wound onto the spool when the fisherman rotates said winding handle thereof in the winding direction, and said winding handle and said spool cup are allowed to rotate in the referse direction and thus said line is allowed to be unwound from said spool when the fisherman releases said winding handle and when the fishing line is in tension.

SUMMARY OF THE INVENTION

Accordingly, it is the primary object of the present invention to provide a spinning type fishing reel, which, during winding in of the fishing line, offers free selection of whether a clicking sound is produced by the ratchet mechanism, or not.

It is a further object of the present invention to provide such a spinning type fishing reel, which can be selectively adjusted so as to be beneficial to the environmental quality.

It is a further object of the present invention to provide such a spinning type fishing reel, which can be selectively adjusted so as not to frighten the fish, during winding in of the fishing line.

It is a further object of the present invention to provide such a spinning type fishing reel, which can be selectively adjusted so as not to be annoying to the fisherman, during winding in of the fishing line.

It is a further object of the present invention to provide such a spinning type fishing reel, which on the other hand can be selectively adjusted so as to provide a comforting and familiar sound to the fisherman, during winding in of the fishing line.

It is a further object of the present invention to provide such a spinning type fishing reel, which further can be selectively adjusted so that the fishing line can both be wound in and wound out freely without said ratchet mechanism providing any opposition to said winding in either direction.

According to the most general aspect of the present invention, these and other objects are accomplished by a spinning type fishing reel, comprising: (a) a main body; (b) a handle shaft rotatably supported in said main body; (c) a spool cup shaft rotatably supported in said main body and driven from said handle shaft; (d) a ratchet wheel mounted on said spool cup shaft; (e) a ratchet pawl; (f) a means for biasing said ratchet pawl towards said ratchet wheel; (g) when said ratchet pawl is pressed against said ratchet wheel, said ratchet wheel and said spool cup shaft being only able to rotate in a certain rotational direction, with said handle shaft rotating in another certain rotational direction; further comprising: (h) a friction member mounted on said handle shaft so as to be slippably connected thereto with a certain frictional torque being required to be applied therebetween before mutual slippage occurs in either rotational direction; and (i) a control means for selectively according to control by the user either: (i1) interfering with said friction member but not interfering with said ratchet pawl; or (i2) not interfering with either said friction member or said ratchet pawl; or (i3) interfering with both said friction member and said ratchet pawl; (j) said friction member when not interfered with by said control means, when rotatingly carried by said handle shaft rotating in said another certain rotational direction interfering with said ratchet pawl so as to bias it away from said ratchet wheel, and when rotatingly carried by said handle shaft rotating in the rotational direction opposite to said another certain rotational direction not interfering with said ratchet pawl; (k) said friction member when interfered with by said control means not being allowed to interfere with said ratchet pawl; and (l) said ratchet pawl, when interfered with by said control means, being biased away from said ratchet wheel.

According to such a structure, when said control means is controlled by the user of the fishing reel so as to provide the functions detailed in clause (i1), then the motion of said friction member is interfered with by said control means, so that said friction member is not allowed to interfere with said ratchet pawl, and also said control means does not itself interfere with said ratchet pawl, so that said ratchet pawl is left to be biased by said biasing means against said ratchet wheel at all times, thus providing a type of ratchet action in which, when said handle shaft is rotated in said other certain rotational direction and said ratchet wheel and said spool cup shaft are rotating in said certain rotational direction, (these rotational directions corresponding to winding up of a fishing line on a fishing spool by a spool cup mounted on said spool cup shaft), a repeated clicking noise is produced by said ratchet pawl repeatedly striking against said ratchet wheel, while further said ratchet pawl by its ratchet action against said ratchet wheel prevents said handle shaft being rotated in the rotational direction opposite to said other certain rotational direction and said ratchet wheel and said spool cup shaft being rotated in the rotational direction opposite to said certain rotational direction, (these rotational directions corresponding to unwinding of said fishing line from said fishing spool). On the other hand, when said control means is controlled by the user of the fishing reel so as to provide the functions detailed in clause (i2), then again said control means does not interfere with said ratchet pawl, and also the motion of said friction member is not now interfered with by said control means either, so that said friction member is allowed to interfere with said ratchet pawl so as to bias it away from said ratchet wheel, when and only when said handle shaft is rotated in said another certain rotational direction. Thereby, when said handle shaft is rotated in said other certain rotational direction and said ratchet wheel and said spool cup shaft are rotating in said certain rotational direction, no clicking noise is produced by said ratchet pawl striking against said ratchet wheel, since said ratchet pawl is biased away from said ratchet wheel, and said rotation is allowed and proceeds substantially silently, while on the other hand when tension in the fishing line, or an attempt made by the user to rotate said handle shaft in the rotational direction opposite to said other certain rotational direction, tries to rotate said ratchet wheel and said spool cup shaft in the rotational direction opposite to said certain rotational direction, then said ratchet pawl is allowed to be biased by said biasing means against said ratchet wheel, and thus by its ratchet action against said ratchet wheel said ratchet pawl prevents said handle shaft and said spool cup shaft thus being rotated substantially. Further, when said control means is controlled by the user of the fishing reel so as to provide the functions detailed in clause (i3), then said control means positively interferes with said ratchet pawl at all times, so as to bias it away from said ratchet wheel; and in this state of affairs, whichever way said handle shaft and said spool cup shaft attempt to rotate, this rotation will not be opposed by the ratchet pawl, and accordingly said rotation in either direction, either to wind up or to unwind the fishing line, is allowed and proceeds substantially silently. Thereby, in summmary, according to operation of said control means according either to clause (i1) or clause (i2) respectively, this fishing reel, during winding in of the fishing line, offers ratchet action, with a free selection of whether a clicking sound is produced by the ratchet mechanism, or not. Thus, this fishing reel can be selectively adjusted, during winding in of the fishing line, so as to be beneficial to the environmental quality, so as not to frighten the fish, and so as not to be annoying to the fisherman. On the other hand, this fishing reel can be selectively adjusted, during winding in of the fishing line, so as to provide a comforting and familiar sound to the fisherman. Finally, this fishing reel, according to operation of said control means according to clause (i3), further can be selectively adjusted so that the fishing line can both be wound in and wound out freely, substantially silently, without said ratchet mechanism providing any opposition to said winding in either direction.

Further, according to a more particular aspect of the present invention, these and other objects are more particularly and concretely accomplished by a spinning type fishing reel of the type described above, wherein said ratchet pawl comprises first and second projections, said friction member comprises first and second projections, and said control means comprises first and second pressure members; said control means being controllable to either (a) press its said first pressure member against said first projection of said friction member but not to press its said second pressure member against said first projection of said ratchet pawl; or (b) not to press its said first pressure member against said first projection of said friction member and also not to press its said second pressure member against said first projection of said ratchet pawl; or (c) to press its said second pressure member against said first projection of said ratchet pawl; said ratchet pawl, when either its said first or its said second projection is pressed, being displaced away from said ratchet wheel against the biasing action of said biasing means; and said friction member, when its said first projection is pressed by said first pressure member of said control means, being displaced so that its said second projection definitely does not press against said second projection of said ratchet pawl, and, when its said first projection is not pressed, being rotatively carried by the rotation of said handle shaft so that: when said handle shaft is rotated in said certain rotational direction, its said second projection presses against said second projection of said ratchet pawl, and, when said handle shaft is rotated in the rotational direction opposite to said certain rotational direction, its said second projection does not press against said second projection of said ratchet pawl.

According to such a structure, in case (a) the friction member is prevented from ever interfering with said ratchet pawl, by its said first projection being pressed by said first pressure member of said control system, so that at all times the ratcheting action provided by said ratchet pawl against said ratchet wheel is available, with a clicking noise thus being produced; in case (b) the first and second pressure members of the control system do not interfere with said friction member and said ratchet pawl, so that the friction member is carried by the handle shaft so that its second projection presses against the second projection of the ratchet pawl and displaces the ratchet pawl from the ratchet wheel during turning of the handle shaft and the spool cup shaft in their directions to wind up the fishing line, so as to allow this rotation and to produce no clicking noise at this time, while when the handle shaft and the spool cup shaft attempt to tunr in their directions to unwind the fishing line the friction member is carried by the handle shaft so that its second projection leaves the second projection of the ratchet pawl alone and does not thereby displace the ratchet pawl from the ratchet wheel, thus preventing such incipient reverse rotation; and in case (c) the ratchet pawl is positively displaced from said ratchet wheel by said second pressure member of said control system pressing against said first projection of said ratchet pawl, so that no ratchet action of said ratchet pawl against said ratchet is ever available and said handle shaft and said spool cup shaft are allowed to rotate substantially freely.

Further, according to a more particular aspect of the present invention, these and other objects are more particularly and concretely accomplished by a spinning type fishing reel of the type described proximately above, wherein said control system comprises a shaft rotatably mounted in said main body and a control knob mounted on said shaft on the outside of said main body; and wherein said first and second pressure members are fixedly mounted on said shaft.

According to such a structure, by turning this knob, via the shaft the first and second pressure members may be moved, so as selectively to press on the first projections of respectively the friction member and the ratchet pawl, as specified above.

Further, according to a yet more particular aspect of the present invention, these and other objects are more particularly and concretely accomplished by a spinning type fishing reel of the type described proximately above, wherein said control system further comprises a means for positively retaining said shaft in any one of three positions, in one of said positions said first pressure member pressing against said first projection of said friction member but said second pressure member not pressing against said first projection of said ratchet pawl, in another of said positions said first pressure member not pressing against said first projection of said friction member and said second pressure member also not pressing against said first projection of said ratchet pawl, and in the third of said positions said second pressure member pressing against said first projection of said ratchet pawl.

According to such a structure, when once the position of this knob and shaft and the first and second pressure members has been set by the user of the fishing reel, it is positively maintained by this retaining means.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intened to be limitative of the scope of the present invention in any way, since the scope of the present invention is to be defined solely by the legitimate and proper scope of the appended claims. In the drawings, like parts and features are denoted by like reference symbols in the various figures thereof, and:

FIG. 5(c) is a sectional view taken in the same plane as FIG. 5(b), showing the same parts in their positions when unwinding of the fishing line is being attempted.

DESCRIPTION OF THE PREFERRED EMBODIMENT

Figure 1:
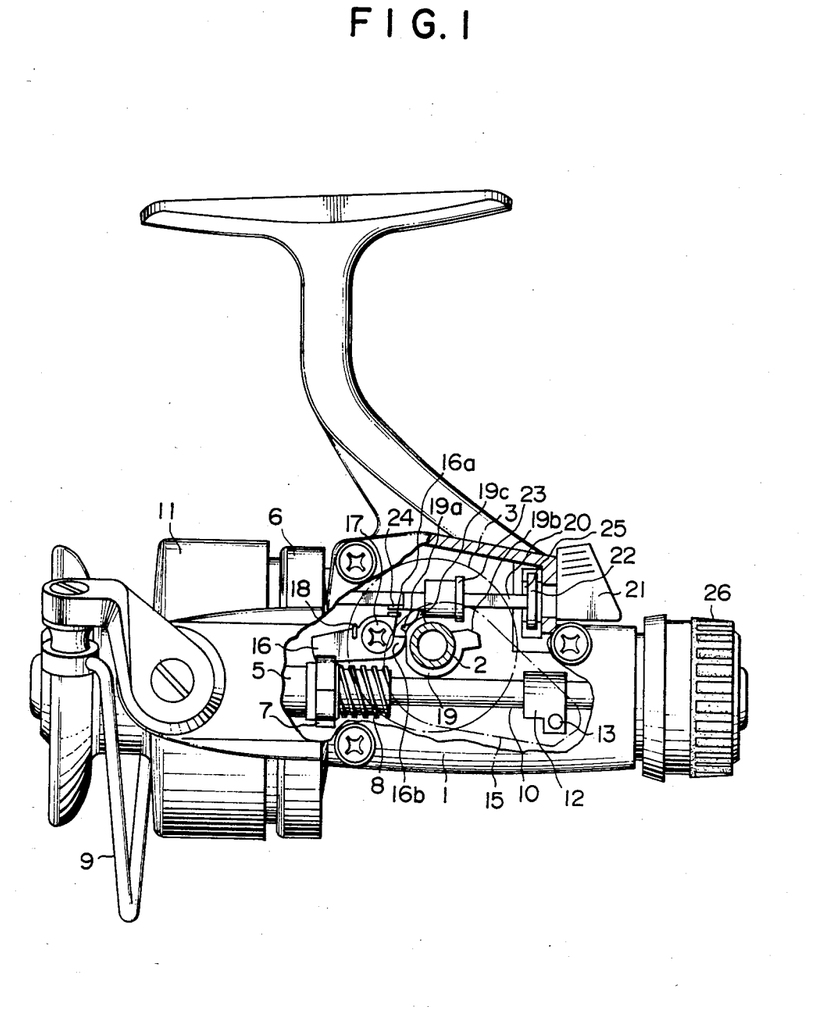
FIG. 1 is a side view of said preferred embodiment of the spinning type fishing reel of the present invention, with a side wall and a face gear and crank arm thereof removed, so as to show its internal construction.
Figure 2:
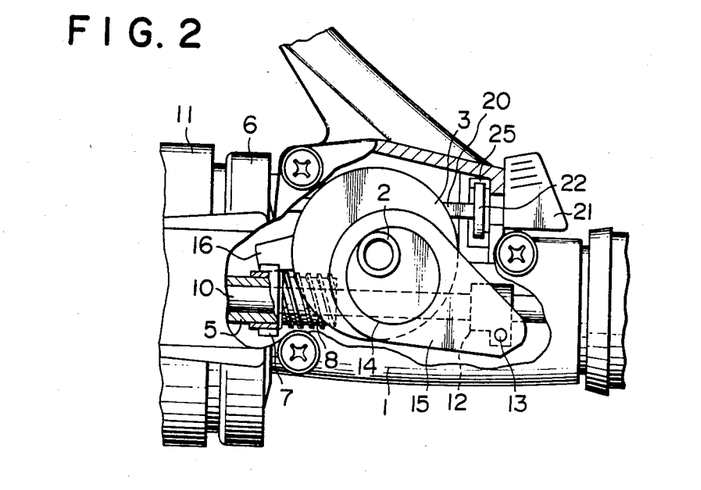
FIG. 2 is a side view similar to FIG. 1, of an essential part only of the device, with the face gear and the crank arm still in place.
Figure 3:
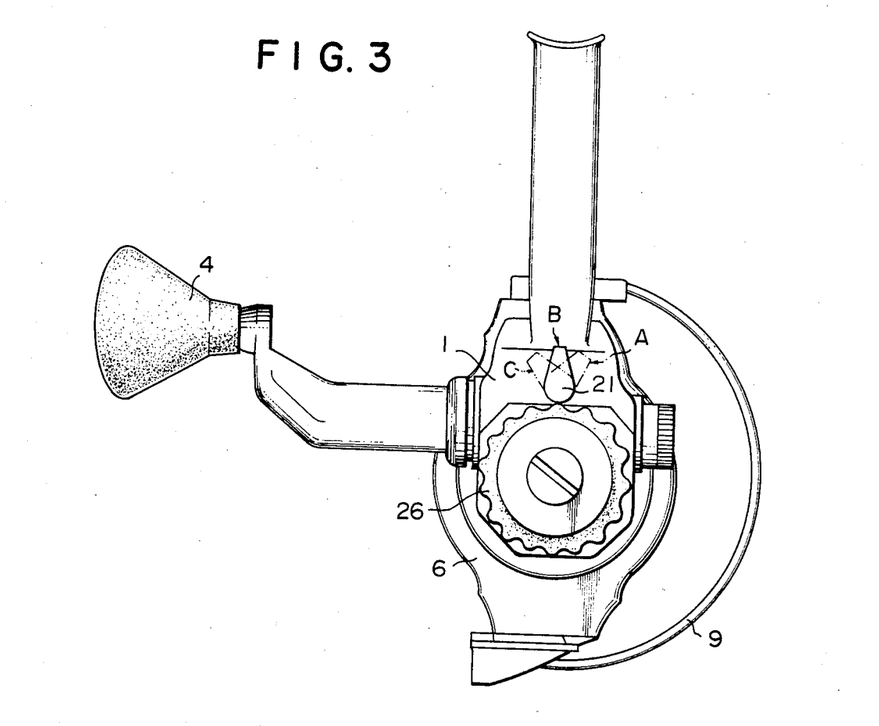
FIG. 3 is a rear end on view of the outside of the fishing reel, as seen from the right side of FIGS. 1 and 2.

The present invention will now be described with reference to the preferred embodiment thereof, and with reference to the appended drawings. FIG. 1 shows a side view of said preferred embodiment of the spinning type fishing reel of the present invention with its side wall sectioned and removed to show the internal working parts thereof, and with a face gear and crank arm also removed, and FIG. 2 shows the essential part of the same view without the face gear and crank arm removed, while FIG. 3 is a rear end on view of the device. In these figures, the reference numeral 1 denotes the main body of the spinning type fishing reel, and a handle shaft 2 is rotatably transversely supported in this main body 1. A winding handle 4 is secured to an outer end of this handle shaft 2, and a face gear 3 is fixedly mounted on the handle shaft 2 within the fishing reel main body 1. A hollow spool cup shaft 5 is rotatably supported in the main body 1, extending longitudinally therein, skew perpendicularly to the handle shaft 2 and below it in FIGS. 1 and 2. A pinion gear 8 is integrally formed on the inner end of this spool cup shaft 5 (the right hand end in FIGS. 1 and 2) and its teeth are meshed with the teeth of the face gear 3. On the outer end of the spool cup shaft 5, outside the main body 1, a spool cup 6 is fixedly mounted; and to this spool cup 6 there is rotatably mounted, in a per se conventional manner, a pickup or bail 9. A ratchet wheel 7 is fixedly mounted on the spool cup shaft 5 within the main body 1 of the reel, just to the outside side of the pinion gear 8.

Within the central axial hole of the hollow spool cup shaft 5 there is fitted a spool shaft 10, the outer cylindrical surface of which conforms closely to the inner cylindrical surface of said spool cup shaft 5, so that said spool shaft 10 is rotatably supported by said spool cup shaft 5 and is also axially slidable therein. The spool shaft 10 is also rotatable with respect to the main body 1. On the outer end of the spool shaft 10, outside the main body 1, a spool 11 is fixedly mounted. This spool 11 cooperates with the bail 9 in a per se well known way for winding fishing line (not shown). A pin support member 12 is mounted on the right side portion in the figures of the spool shaft 10 in such a way as to be freely rotatable with respect to said spool shaft 10 but so as not to be axially movable with respect thereto, as for example being engaged to a groove formed on said spool shaft 10 by a clip or the like. A pin 13 is fixedly mounted in the pin support member 12 and projects outwardly therefrom skew perpendicularly to the spool shaft 10. Although it is not so visible in the figures, in fact the free end of this pin 13 is engaged into a pin guide groove (not shown) formed on the inner surface of the main body 1 of the fishing reel and extending parallel to the spool shaft 10 (this guide groove is in fact formed in that portion of the main body 1 which is cut away and removed in FIGS. 1 and 2, and that is the reason why this groove cannot be seen in the figures). Thereby, the pin 13 and the pin support member 12 are able to move to and fro in the axial direction of the spool shaft 10, along of course with the spool shaft 10 which is coupled with regard to its axial movement with said pin support member 12 as explained above, but are not able to move or to rotate in any other direction. On the side of the face gear 3 there is integrally formed a short fat circular crank shaft 14 the central axis of which is eccentrically displaced or cranked away from the central axis of the handle shaft 2 (see FIG. 2), and one end of a crank arm 15 is formed with a circular hole which is engaged over this crank shaft 14. The other end of the crank arm 15 is formed with a small circular hole which is rotatably engaged over the pin 13. Thus, the face gear 3, the crank shaft 14, the crank arm 15, and the pin 13 and the pin support member 12 make up a crank mechanism which, when the handle shaft 2 is rotated by the hand of a fisherman using the fishing reel, converts the rotary motion of said handle shaft 2 into reciprocating motion of the spool shaft 10 and the spool 11, while at the same time of course the spool cup 6 and the bail 9 are being rotated via the gears 3 and 8 and the spool cup shaft 5. Thereby fishing line is wound on the spool 11, guided by the bail 9. A per se conventional drag device is provided for frictionally retarding the rotation of the spool shaft 10, and is controlled by an adjustment knob 26 on the rear of the outside of the main body 1.

Figure 4A:
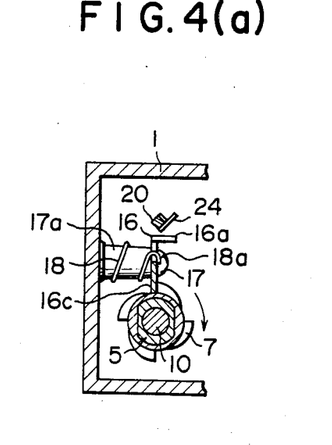
FIGS. 4(a) through 4(d) show the parts of a ratchet mechanism of said preferred embodiment in their positions when winding rotation of a spool cup is available with a clicking sound being produced but no unwinding rotation of said spool cup is allowed, FIG. 4(b) being a sectional view of the apparatus taken in substantially the same plane as FIGS. 1 and 2, while views 4(a), 4(c), and 4(d) are sectional views taken respectively along planes indicated by the arrows designated by IVa—IVa, IVc—IVc, and IVd—IVd in FIG. 4(b)
Figure 4B:
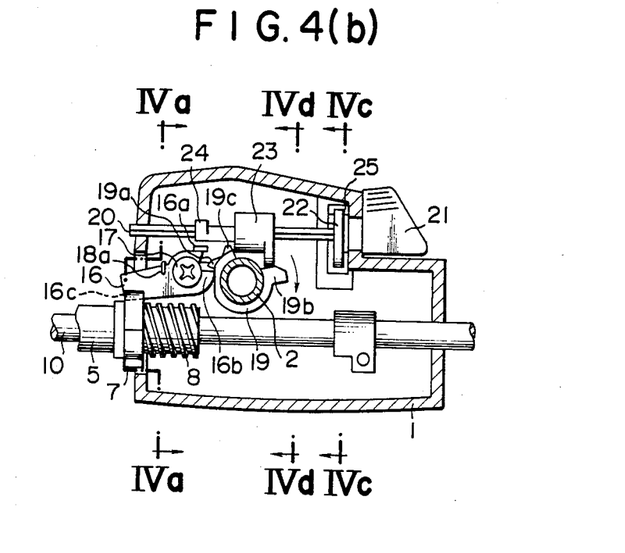

Reference will now be made to the various views of FIGS. 4, 5, and 6 for explaining the details of the ratchet mechanism including the ratchet wheel 7, which relates to the essence of the present invention. FIGS. 4(a) through 4(d) show the parts of the ratchet mechanism in their positions when winding rotation of the spool cup 6 is available with a clicking sound being produced, but no unwinding rotation of said spool cup 6 is allowed; FIGS. 5(a) through 5(e) show said parts of the ratchet mechanism in their positions when winding rotation of the spool cup 6 is available with no clicking sound being produced, but no unwinding rotation of said spool cup 6 is allowed; and FIGS. 6(a) through 6(d) show said parts of the ratchet mechanism in their positions when both winding and unwinding rotation of the spool cup 6 is freely allowed, with no clicking sound being produced in either case. In each of these figures, view (b) is a sectional view of the apparatus taken in substantially the same plane as FIGS. 1 and 2, while the other views are sectional views taken respectively along planes indicated by the arrows designated by the roman numeral corresponding to the arabic numeral of the figure, suffixed with suffix letters corresponding to the suffix letter of the view; except that FIG 5(c) is a sectional view taken in the same plane as FIG. 5(b), showing the parts in a different position. Now, a projection 17a is formed as extending from the main body 1 inwardly, and a screw 17, which extends with its central axis skew perpendicular to the central axis of the spool cup shaft 5, is mounted in this projection 17a and rotatably mounts to it a pawl 16. When the pawl 16 is rotated in the anticlockwise direction as seen in FIG. 4(b), then its engaging end 16c becomes engaged with the ratchet wheel 7 on the spool cup shaft 5, as may be understood also from FIG. 4(a); but on the other hand, when the pawl 16 is rotated in the clockwise direction as seen in FIG. 4(b), then its engaging end 16c becomes disengaged with said ratchet wheel 7. This pawl 16 has also, towards its other end, a sidewise extending projection 16a and a substantially radially extending projection 16b. A torsion coil spring 18 which is fitted over the projection 17a has one end (not visible in the drawings) engaged to the main body 1 of the fishing reel, while its other end 18a is twisted round and is engaged over a part of the pawl 16, so as to bias said pawl 16 in the anticlockwise direction as seen in FIG. 4(b), i.e. so as to urge its engaging end 16c towards the ratchet wheel 7.

Around the handle shaft 2 there is fitted a friction member 19, which is formed as a ring with an opening, and is made of an elastic material. The size of the hole through the center of this friction member 19 in its unstressed state is somewhat smaller than the size of the handle shaft 2, so that when said friction member 19 is thus fitted around said handle shaft 2 it grips thereto with a certain amount of frictional force therebetween; in other words, when the friction member 19 is forcibly rotated on and with respect to the handle shaft 2, a certain torque is required to be applied for producing mutual slippage therebetween. This friction member 19 is formed with an operating projection 19a adapted and positioned so as to press against the radial projection 16b of the pawl 16 when the friction member 19 is rotated in the anticlockwise direction in FIG. 4(b), with a control projection 19b, and with a stop projection 19c.

In the main body 1 there is rotatably mounted a switching shaft 20 which extends parallel to the spool shaft 10 and the spool cup shaft 5 and above them in the figures. On the outer rear end of this switching shaft 20, outside the body 1 of the fishing reel, there is fixed a click/quiet/release control knob 21, which can be clearly seen in FIG. 3 which is the rear view of the device. On the switching shaft 20 there is fixed a switching member 23 formed generally as a cam opposing the control projection 19b of the friction member 19, and further there is fixed a pawl operating member 24, opposing the operating projection 16a of the pawl 16. Also, on the switching shaft 20, next to the wall of the main body 1, there is fixed a click stop member 22, which is formed generally as a disk with three stop projections 22a, 22b, and 22c on its circumference. As can be best seen in FIG. 4(c) and FIGS. 5(d) and 6(c), a piece of spring material 25 bent in a U shape with a click stop kink 25a formed therein is fixed to the main body 1, so as to press against and cooperate with the click stop member 22. Thereby, by turning the click/quiet/release control knob 21 on the outside of the device by hand, the switching shaft 20 and the members 22, 23 and 24 fixed thereon can be rotated, and they are positioned preferentially in any one of three positions, indicated by "A", "B", and "C" respectively in FIG. 3: in position "A" the stop projection 22a of the click stop member 22 clicks into and locates in the click stop kink 25a of the spring piece 25; in position "A" the stop projection 22a of the click stop member 22 clicks into and locates in the click stop kink 25a of the spring piece 25; in position "B" the stop projection 22b of said click stop member 22 clicks into and locates in said click stop kink 25a of said spring piece 25; and in position "C" the stop projection 22c of said click stop member 22 clicks into and locates in said click stop link 25a of said spring piece 25.

Now, the operation of this preferred embodiment of the spinning type fishing reel of the present invention will be explained.

First, considering the basic action, when the hand of the fisherman using the reel turns the handle attached to the handle shaft 2 in the anticlockwise direction as seen in the figures such as FIG. 5(b), which is the proper direction for winding the fishing line, then the face gear 3 is turned, and thus the pinion gear 8 is driven, driving the spool cup shaft 5 and the spool cup 6 and the bail 9, thus to wind up the fishing line on the spool 11, which is simultaneously being axially reciprocated as described earlier through the action of the crank mechanism including the crank arm 15. This basic action is per se the same as that of a conventional spinning type fishing reel.

Figure 4C:
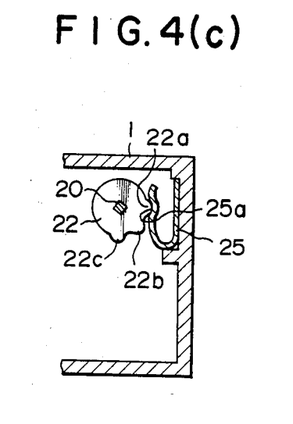

Next, suppose that it is desired to use the fishing reel in its operational mode in which the spool cup 6 can only be turned so as to wind up the fishing line, and cannot be turned so as to unwind the fishing line, with a clicking noise being produced as the fishing line is wound up, then the click/quiet/release control knob 21 is set to its position "A" as shown in FIG. 3, so that, as shown in FIG. 4(c), the stop projection 22a of the click stop member 22 clicks into and locates in the click stop kink 25a of the spring piece 25, thus holding the switching shaft 20 in this "A" position.

Figure 4D:
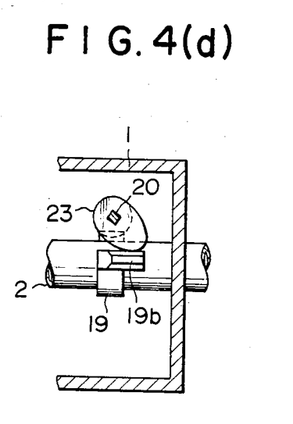

In this mode, the fishing reel operates as follows. The pawl operating member 24 does not contact the operating projection 16a of the pawl 16, as seen in FIG. 4(a), and accordingly does not interfere with the pawl 16 at all. On the other hand, the projecting cam portion of the switching member 23 presses against the control projection 19b of the friction member 19 and forces it downwards as seen in FIG. 4(d), thus forcibly rotating the friction member 19 in the clockwise direction in the figure and ensuring that its operating projection 19a does not contact or press against the radial projection 16b of the pawl 16, and accordingly does not interfere with the pawl 16 at all, either. In this state, the pawl 16 is free to be moved by the biasing action of the torsion coil spring 18 which presses its engaging end 16c towards and against the ratchet wheel 7, and accordingly, if the handle shaft 2 is turned in the proper direction for winding the fishing line, then the pinion gear 8 is driven, which turns the ratchet wheel 7 in the clockwise direction as seen in FIG. 4(a), and thus the teeth of said ratchet wheel 7 click past the pawl 16 while each slidingly pushing it upwards to a certain degree and then allowing it to drop back against the ratchet wheel 7, and thus the spool cup shaft 5 and the spool cup 6 and the bail 9 are rotated so as to wind up the fishing line on the spool 11, which is simultaneously being axially reciprocated as described earlier. This winding action is therefore allowed, but is attended with a certain repeated clicking noise. On the other hand, if the spool cup shaft 5 is attempted to be turned in the opposite direction, i.e. the proper direction for unwinding the fishing line, either by tension of the fishing line or by the hand of the user on the handle 2, then substantially immediately the back or vertical side of one of the ratchet teeth of the ratchet wheel 7 comes into abrupt contact with the side of the engaging end 16c of the pawl 16 which is being biased towards the axis of said ratchet wheel 7, thus immediately stopping said reverse unwinding rotation of the handle shaft 2 and preventing substantial unwinding of the fishing line.

Figure 5A:
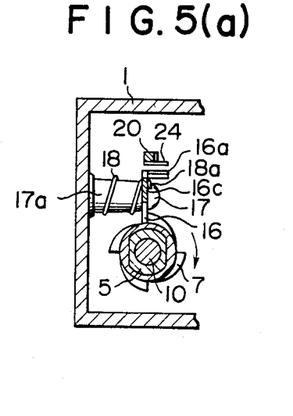
FIGS. 5(a) through 5(e) show said parts of the ratchet mechanism in their positions when winding rotation of the spool cup is available with no clicking sound being produced but again no unwinding rotation of said spool cup is allowed, FIG. 5(b) being a sectional view of the apparatus taken in substantially the same plane as FIGS. 1 and 2 and showing the parts in their positions during winding up of the fishing line, while views 5(a), 5(d), and 5(e) are sectional views taken respectively along planes indicated by the arrows designated by Va—Va, Vd—Vd, and Ve—Ve in FIG. 5(b)
Figure 5B:
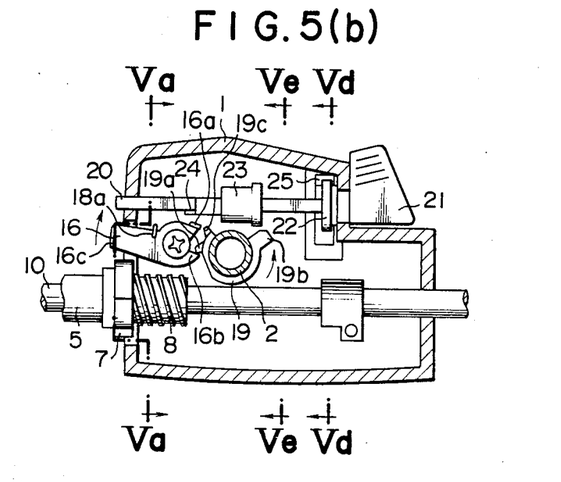
Figure 5C:
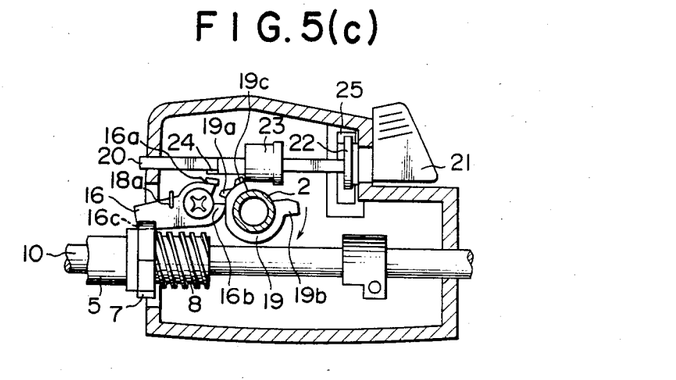
Figure 5D:
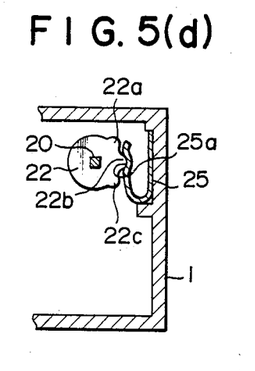

Next, suppose that it is desired to use the fishing reel in its operational mode in which the spool cup 6 can only be turned so as to wind up the fishing line, and cannot be turned to as to unwind the fishing line, with no clicking noise being produced as the fishing line is wound up, then the click/quiet/release control knob 21 is set to its position "B" as shown in FIG. 3, so that, as shown in FIG. 5(d), the stop projection 22b of the click stop member 22 clicks into and locates in the click stop kink 25a of the spring piece 25, thus holding the switching shaft 20 in this "B" position.

Figure 5E:
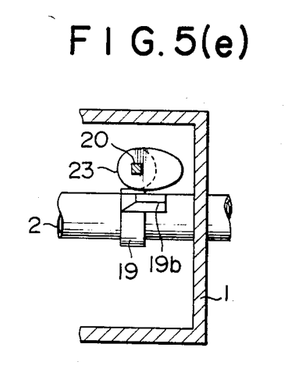

In this mode, the fishing reel operates as follows. The pawl operating member 24 still does not contact the operating projection 16a of the pawl 16, as seen in FIG. 5(a), and accordingly still does not interfere with the pawl 16 at all. On the other hand, the projecting cam portion of the switching member 23 now no longer presses against the control projection 19b of the friction member 19, as seen in FIG. 5(e).

Now, if the handle shaft 2 is turned in the proper direction for winding the fishing line, i.e. the anticlockwise direction as seen in FIG. 5(b), then this rotation of the handle shaft 2 carries the friction member 19 with it in the anticlockwise direction in the figure for a certain distance with a certain turning torque, as indicated by the arrow in FIG. 5(b), and this causes the operating projection 19a of said friction member 19 to press against the radial projection 16b of the pawl 16, which forcibly drives the pawl 16 in the clockwise direction in the figure against the biasing action of the torsion coil spring 18 which is overcome, thus lifting the engaging end 16c of said pawl 16 away from the teeth of the ratchet wheel 7. Accordingly, as further also the pinion gear 8 is driven, which turns the ratchet wheel 7 in the clockwise direction as seen in FIG. 5(a), the teeth of said ratchet wheel 7 are allowed freely to pass the pawl 16 without being at all affected thereby, and thus the spool cup shaft 5 and the spool cup 6 and the bail 9 are rotated so as to wind up the fishing line on the spool 11, which is simultaneously being axially reciprocated as described earlier. This winding action is therefore allowed and is not attended with any clicking noise.

On the other hand, if the spool cup shaft 5 is attempted to be turned in the opposite direction which is the direction for unwinding the fishing line, then the handle shaft 2 is attempted to be turned in the clockwise direction as seen in FIG. 5(c), and this rotation of the handle shaft 2 carries the friction member 19 with it in the clockwise direction in the figure for a certain distance with a certain turning torque, as indicated by the arrow in FIG. 5(c), until the stop projection 19c in fact comes into contact with the end of the switching member 23 (which functions as a convenient stop member), and this causes the operating projection 19a of said friction member 19 to be disengaged from the radial projection 16b of the pawl 16, and this allows the pawl 16 to be rotated by the biasing action of the torsion coil spring 18 in the anticlockwise direction in the figure. This presses the engaging end 16c of said pawl 16 against the teeth of the ratchet wheel 7. Accordingly, as further also the pinion gear 8 is driven, which turns the ratchet wheel 7 in the anticlockwise direction in FIG. 5(a), substantially immediately the back or vertical side of one of the ratchet teeth of the ratchet wheel 7 comes into abrupt contact with the side of said engaging end 16c of the pawl 16, thus immediately stopping said reverse unwinding rotation of the spool cup shaft 5, the spool cup 6, the bail 9, and the handle shaft 2, and preventing substantial unwinding of the fishing line.

Figure 6A:
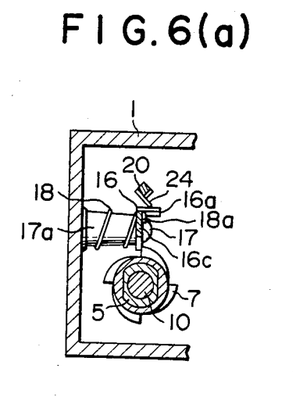
FIGS. 6(a) through 6(d) show said parts of the ratchet mechanism in their positions when both winding and unwinding rotation of the spool cup is freely allowed, with no clicking sound being produced in either case, again FIG. 6(b) being a sectional view of the apparatus taken in substantially the same plane as FIGS. 1 and 2, while views 6(a), 6(c), and 6(d) are sectional views taken respectively along planes indicated by the arrows designated by VIa—VIa, VIc—VIc, and VId—VId in FIG. 6(b)
Figure 6B:
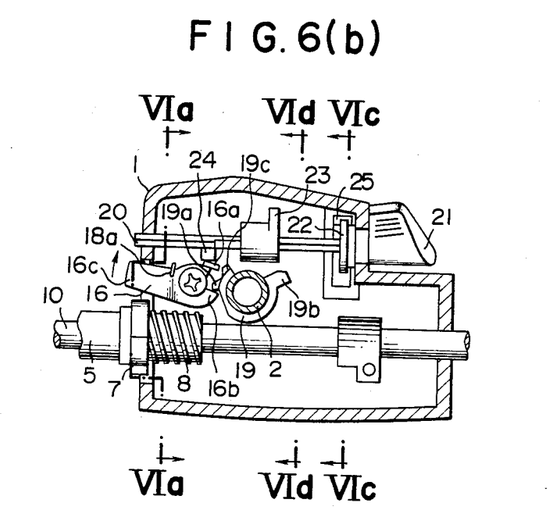
Figure 6C:
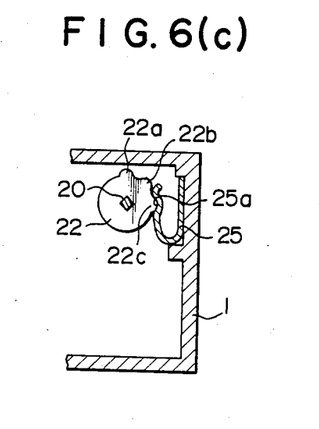

Finally, suppose that it is desired to use the fishing reel in its operational mode in which the spool cup 6 can both be turned so as to wind up the fishing line, and can also be turned so as to unwind the fishing line, with no clicking noise being produced in either direction of winding or unwinding, then the click/quiet/release control knob 21 is set to its position "C" as shown in FIG. 3, so that, as shown in FIG. 6(c), the stop projection 22c of the click stop member 22 clicks into and locates in the click stop kink 25a of the spring piece 25, thus holding the switching shaft 20 in this "C" position.

Figure 6D:
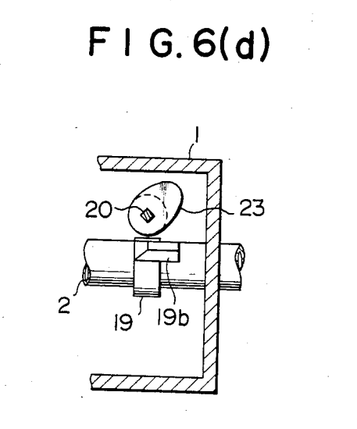

In this mode, the fishing reel operates as follows. The pawl operating member 24 now positively contacts the operating projection 16a of the pawl 16, as seen in FIG. 6(a), and accordingly pushes on this projection 16a, which forcibly drives the pawl 16 in the clockwise direction in FIG. 6(b) against the biasing action of the torsion coil spring 18 which is overcome, thus lifting the engaging end 16c of said pawl 16 away from the teeth of the ratchet wheel 7; and also, actually, the projecting cam portion of the switching member 23 again does not press against the control projection 19b of the friction member 19, as seen in FIG. 6(d); but this is irrelevant to the actual operation of the fishing reel, in this case, since the turning action of the pawl 16 in the clockwise direction in FIG. 6(b) occurs irrespective of the rotational direction or amount of the handle shaft 2 or the friction member 19. Accordingly, as the handle shaft 2 is rotated in either rotational direction, and as further also the pinion gear 8 is driven, which turns the ratchet wheel 7 in said either rotational direction, the teeth of said ratchet wheel 7 are in either case allowed freely to pass the pawl 16 without being at all affected thereby, and thus the spool cup shaft 5 and the spool cup 6 and the bail 9 are rotated so as either to wind up the fishing line on the spool 11 or to unwind said fishing line therefrom, said spool 11 again being simultaneously axially reciprocated as described earlier. Thus either the winding or unwinding action for the fishing line is allowed, neither of them being attended with any clicking noise.

Thus, in summmary, if the click/quiet/release control knob 21 is set to its position "A" or its position "B", respectively, this spinning type fishing reel during winding in of the fishing line offers ratchet action with a free selection of whether a clicking sound is produced by the ratchet mechanism, or not, respectively. Thus, this fishing reel can be selectively adjusted, during winding in of the fishing line, so as by producing no clicking sound to be beneficial to the environmental quality, so as also not to frighten the fish, and so as also not to be annoying to the fisherman. On the other hand, this fishing reel can be selectively adjusted, during winding in of the fishing line, so as by producing a clicking sound to provide a comforting and familiar sound to the fisherman. Finally, this fishing reel, if the click/quiet/release control knob 21 is set to its position "C", further can be selectively adjusted so that the fishing line can both be wound in and wound out freely, substantially silently, without said ratchet mechanism providing any opposition to said winding in either direction.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. A spinning type fishing reel, comprising:
  (a) a main body;
  (b) a handle shaft rotatably supported in said main body;
  (c) a spool cup shaft rotatably supported in said main body and driven from said handle shaft;
  (d) a ratchet wheel mounted on said spool cup shaft;
  (e) a ratchet pawl having first and second projections;
  (f) a biasing means for biasing said ratchet pawl toward said ratchet wheel;
  (g) when said ratchet pawl is pressed against said ratchet wheel, said ratchet wheel and said spool cup shaft being only able to rotate in a first direction, with said handle shaft rotating in a second direction; further comprising:
  (h) a friction member having first and second projections, said friction member being rotatably and frictionally mounted on said handle shaft so that a certain frictional torque is required to be applied therebetween before mutual slippage occurs in either direction; and
  (i) a control means having first and second pressure members for selectively, according to control by the user, performing any one of the following:
    (i1) interfering with said friction member but free from interference with said ratchet pawl by pressing said control means first pressure member against said friction member first projection while preventing any pressure between said control means second pressure member and the said ratchet pawl first projection; or
    (i2) being free from interference with both said friction member and said ratchet pawl by preventing any pressure between said control means first pressure member and said friction member first projection, and simultaneously preventing any pressure between said control means second pressure member and said ratchet pawl first projection; or
    (i3) interfering with said ratchet pawl by pressing said control means second pressure member against ratchet pawl first projection;
  (j) when said friction member is free from interference with said control means so that:
    (j1) when said handle shaft is rotating in a third direction opposite said second direction, said friction member is free from engagement with said ratchet pawl; and (j2) when said handle shaft is rotating in said second direction, said friction member engages said ratchet pawl to bias said ratchet pawl away from said ratchet wheel;

(k) when said control means first pressure member engages said friction member first projection, said friction member is displaced so that said friction member second projection is free from engagement with said ratchet pawl second projection;

(l) when said control means first pressure member is free from engagement with said friction member first projection, said friction member is rotatably carried by said handle shaft so that:

(l1) when said handle shaft is rotating in said second direction, said friction member second projection engages said ratchet pawl second projection; and (l2) when said handle shaft is rotating in said third direction, said friction member second projection is free from engagement with said ratchet pawl second projection; and (m) said ratchet pawl, when interfered with by said control means, being biased away from said ratchet wheel, and when either said ratchet pawl first or second projection is pressed, said ratchet pawl being displaced from said ratchet wheel against the action of said biasing means.

2. A spinning type fishing reel according to claim 1, wherein said control system comprises a shaft rotatably mounted in said main body and a control knob mounted on said shaft on the outside of said main body; and wherein said first and second pressure members are fixedly mounted on said shaft.

3. A spinning type fishing reel according to claim 2, wherein said control system further comprises a means for positively retaining said shaft in any one of three positions, in a first position said first pressure member pressing against said first projection of said friction member but said second pressure member avoiding pressing against said first projection of said ratchet pawl, in a second position said first pressure member avoiding pressing against said first projection of said friction member and said second pressure member avoiding pressing against said first projection of said ratchet pawl, and in a third position said second pressure member pressing against said first projection of said ratchet pawl.

* * * * *